United States Patent
Vonbank (10) Patent No.: US 10,740,276 B1
(45) Date of Patent: Aug. 11, 2020

(54) METHOD FOR ENHANCING EXECUTION OF AS5643 FUNCTIONS

(71) Applicant: Michael Erich Vonbank, Llandudno (GB)

(72) Inventor: Michael Erich Vonbank, Llandudno (GB)

(73) Assignee: DAP Holding B.V., Oldnenzall (NL)

( * ) Notice: Subject to any disclaimer, the term of this patent is extended or adjusted under 35 U.S.C. 154(b) by 0 days.

(21) Appl. No.: 16/389,163

(22) Filed: Apr. 19, 2019

(51) Int. Cl.
*G06F 13/42* (2006.01)
*H04L 12/26* (2006.01)

(52) U.S. Cl.
CPC ........ *G06F 13/4295* (2013.01); *H04L 43/087* (2013.01); *H04L 43/14* (2013.01)

(58) Field of Classification Search
CPC . G06F 13/4295; G06F 13/426; H04L 43/087; H04L 43/14
See application file for complete search history.

(56) References Cited

U.S. PATENT DOCUMENTS

| | | | | |
|---|---|---|---|---|
| 6,831,926 B1* | 12/2004 | Kinstler | ............. | H04L 12/6418 370/467 |
| 6,975,654 B1* | 12/2005 | Domon | ............ | H04L 12/40052 370/509 |
| 9,575,866 B1* | 2/2017 | Mourn | ................. | G06F 11/349 |
| 2008/0126654 A1* | 5/2008 | Mourn | ............... | G06F 13/4282 710/300 |
| 2008/0192772 A1* | 8/2008 | Kinstler | ................. | H04L 12/66 370/468 |

OTHER PUBLICATIONS

NewWave DV, "1394b AS5643 Offload Engine IP Core Datasheet," Mar. 1, 2019 (Year: 2019).*

* cited by examiner

*Primary Examiner* — Tim T Vo
*Assistant Examiner* — Phong H Dang
(74) *Attorney, Agent, or Firm* — Edwin H. Crabtree; Ramon L. Pizarro (57) ABSTRACT

A method for enhancing an execution of AS5643 functions within AS5643 bus nodes. Also, at the same time, the method reduces overall software requirements and complexity of the AS5643 functions. The method includes attaching a AS5643 function block to the one or more interface layers of an IEEE-1394 serial bus. The AS5643 function block includes firmware or hardware. Further, the method provides the function block with a programmable code.

21 Claims, 7 Drawing Sheets

Extending existing IEEE-1394 functions with AS5643 functionality

Figure1: Nodes A – H and CC connected to form an IEEE1394 bus.

Figure 2: High-level system architecture for devices interconnected by IEEE-1394

Figure 3: AS5643 functions in a SW layer on top of the silicon-supported IEEE-1394 layers Figure 4: Approach of creating a self-contained AS5643 block Figure 5: AS5643 functionalities in IEEE-1394 layers by creating additional AS5643-specific functions Figure 6: Extending existing IEEE-1394 functions with AS5643 functionality Figure 7: Decision-making process which implementation approach is preferable for STOF packet generation

METHOD FOR ENHANCING EXECUTION OF AS5643 FUNCTIONS

A method for enhancing an execution of AS5643 functions within AS5643 compliant nodes, and more particularly but not by way of limitation, to a method of attaching a self-contained AS5643 function block to one or more interfaces of an IEEE-1394 serial bus.

SUMMARY OF THE INVENTION

In view of the foregoing, it is the object of the subject invention to reduce system overhead and introduced non-deterministic timing jitter caused by implementing AS5643 functionality as part of software layers. Providing this functionality in hardware/firmware adds improved accuracy and determinism and therefore is superior to the software approach.

These and other objects of the present invention will become apparent to those familiar with IEEE-1394 Serial bus technology and other similar communication technologies when reviewing the following detailed description, showing novel construction, combination, and elements as described herein.

BACKGROUND OF THE INVENTION

(a) Field of Invention

This invention relates to the performance of an IEEE-1394 serial bus and AS5643 functional enhancements, and more particularly, but not by way of limitation, to a method for enhancing the AS5643 functionalities during avionics node operations. The method provides for improved timing behavior, enhanced node resource utilization and lowered node system complexity and presents compelling benefits for deploying IEEE-1394 bus connectivity in AS5643-compliant avionics network implementations.

(b) Discussion of Prior Art

The IEEE-1394-2008 standard (and earlier revisions) have defined a node architecture for typical devices compliant with this serial bus technology. The mentioned architecture specifies the bottom two layers of the standard OSI model for networked devices. The technology was successfully deployed in millions of consumer electronics, PC and camera devices by using commercially available silicon that has been partially optimized for that very use. The onset of usage of IEEE-1394 as a next-generation communication technology in the avionics industry revealed the need for extensions to the IEEE-1394 specification. IEEE-1394 was not designed to address some very avionics-specific requirements and standardization efforts eventually led to the development of the SAE AS5643 specification.

AS5643 was defined with a clear objective: it needed to provide a cost-effective way to add avionics requirements and functionality to the existing IEEE-1394 technology and existing manifestations of silicon supporting the technology. Rather than creating a new avionics version of IEEE-1394 the AS5643 version was designed as add-on to the existing technology. IEEE-1394 remained unchanged as the underlying technology and the additional AS5643 features were designed to work with the existing IEEE-1394 chip sets. Essentially this allowed that AS5643 could be added to an IEEE-1394 enabled device using off-the-shelf silicon and silicon chip sets by changing some specific electrical connectivity (usage of active transformers, different wiring and connectors) as well as software-based functionalities. At first sight this seems to be a great concept but the fact that the chip sets miss native support for the AS5643 features together with some rather stringent timing characteristics adds complex implementation requirements to the devices. Such demands can go so far as that the usage of real-time operating systems becomes necessary. This application presents an innovative approach to overcome these hurdles and deployment challenges.

No patents or related specifications describe the unique features and methods of the subject invention for greatly improved integration of AS5643 in avionics devices.

DETAILED DESCRIPTION OF THE PREFERRED EMBODIMENTS

Figure 1:
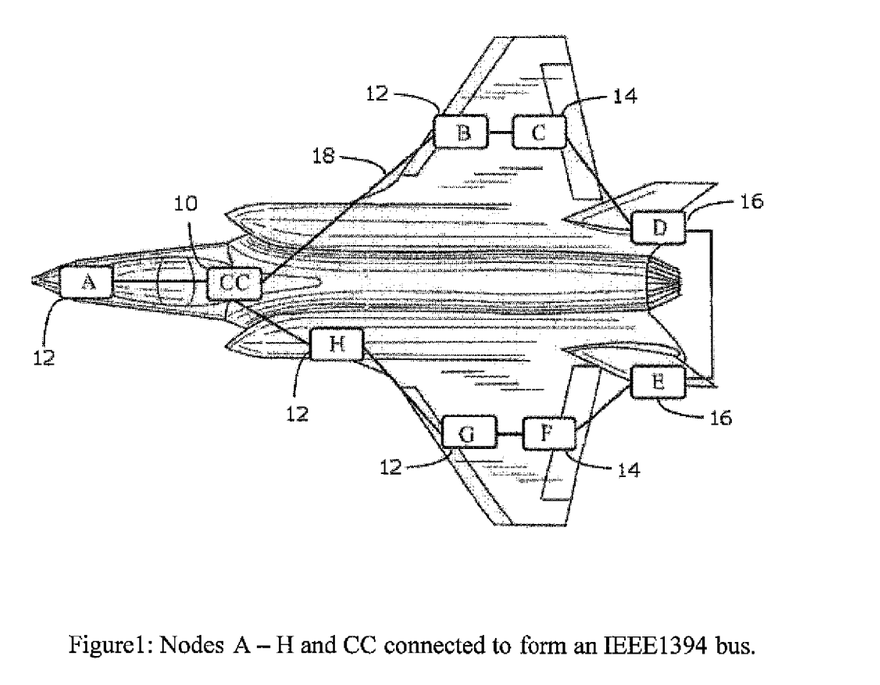
FIG. 1 illustrates Nodes A-H and CC connected to form an IEEE1394 bus.

The accompanying drawings illustrate complete preferred embodiments in the present invention, and in which:

FIG. 1 illustrates a simplified IEEE-1394 avionics network having a Control Computer (CC) device 10 connected to the remote input/output devices 12-16, shown as A through H via signaling hardware 18, i.e. a data bus cable. Together these elements encompass the fly-by-wire network used in many state-of-the-art avionics platforms.

Figure 2:
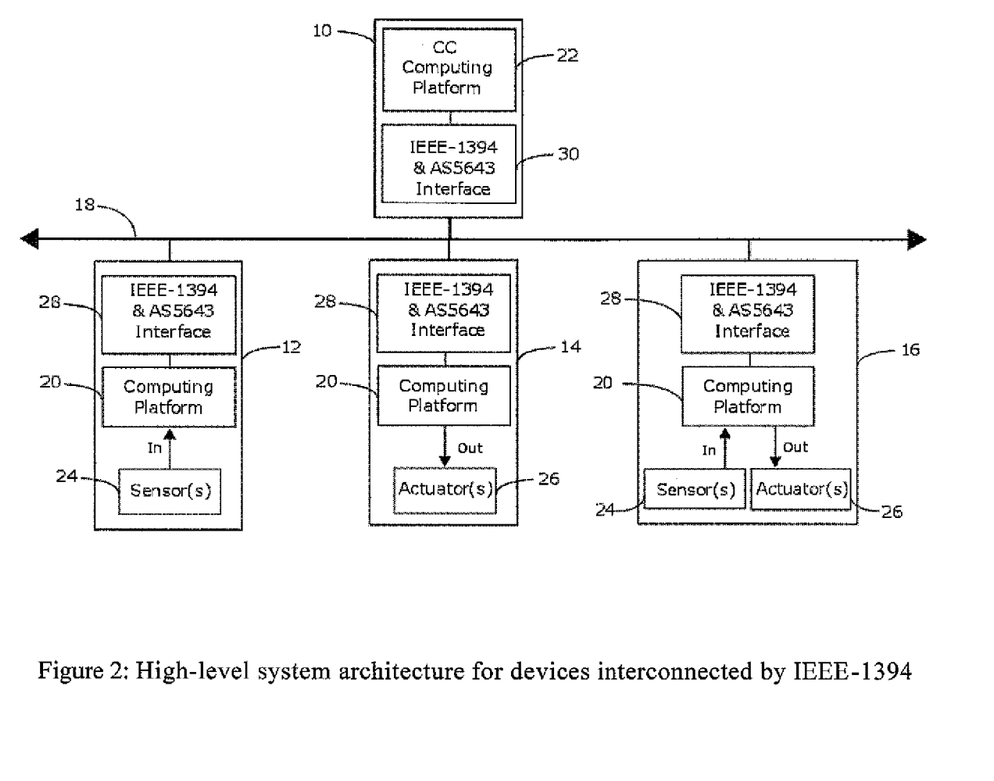
FIG. 2 illustrates a high-level system architecture for devices interconnected by IEEE-1394

The specific tasks performed by such devices can be quite different. However, the devices in a typical avionics control system can typically be categorized into two different groups as depicted in FIG. 2. In the most abstracted view one distinguishes between control computer (CC) devices 10 and remote node (RN) devices 12-16. RN instantiations can consist of either a) a single sensor or a multitude of individual sensors 12, b) a single actuator or a multitude of individual actuators 14, or c) a combination of actuator(s) and sensor(s) in one 1394 device 16. In a sensor device 12 all the specific sensor(s) (e.g. altitude, temperatures, speed, . . . ) will generate sensor data that have to be sent to the CC 10, which—as a response—will send a command to actuators devices 14 to take a specific action (e.g. adjust ailerons, increase engine thrust, etc.). It is important to understand that the communication scheme (master-multi-slave) of Input_RN(s)→CC→Output_RN(s) is maintained even if physical sensors and actuator(s) are combined within one sensor(s)/actuators device. Upon reception of data the CC would validate the data's integrity, perform predefined data analysis and determines resulting actions. Due to the specifics of the ASM data exchange methodology all involved nodes are tasked to adhere to data transmission and reception only during preassigned time slices (STOF RX and TX Offsets), filter received transmissions for asynchronous stream channel IDs, encapsulating ASM packet data payload, perform integrity verification by monitoring the packet heartbeat as well as other tasks going beyond the AS5643 specification but are required by the avionic program ICDs.

In order to perform such tasks, the device's internal structure can be abstracted as depicted in FIG. 2. As shown devices 10, 12, 14, 16 share common aspects as each of them is comprised of a computing platform 20 or 22, an IEEE-1394/AS5643 bus interface 28 or 30 and—in case of RNs the physical sensor(s) 24 and actuator(s) 26. While in RNs (12, 14, 16) the respective computing platforms 20 are typically limited in performance, the computing platform (22) on a Control Computer tends to be significantly more powerful. And in order to match the data throughput and performance requirements the data interface 30 connecting the computing platform on a CC is more elaborate than the one 28 on a RN. However, the fundamental structures and components of the IEEE-1394/AS5643 interfaces 28 and 30 are very much the same.

Figure 3:
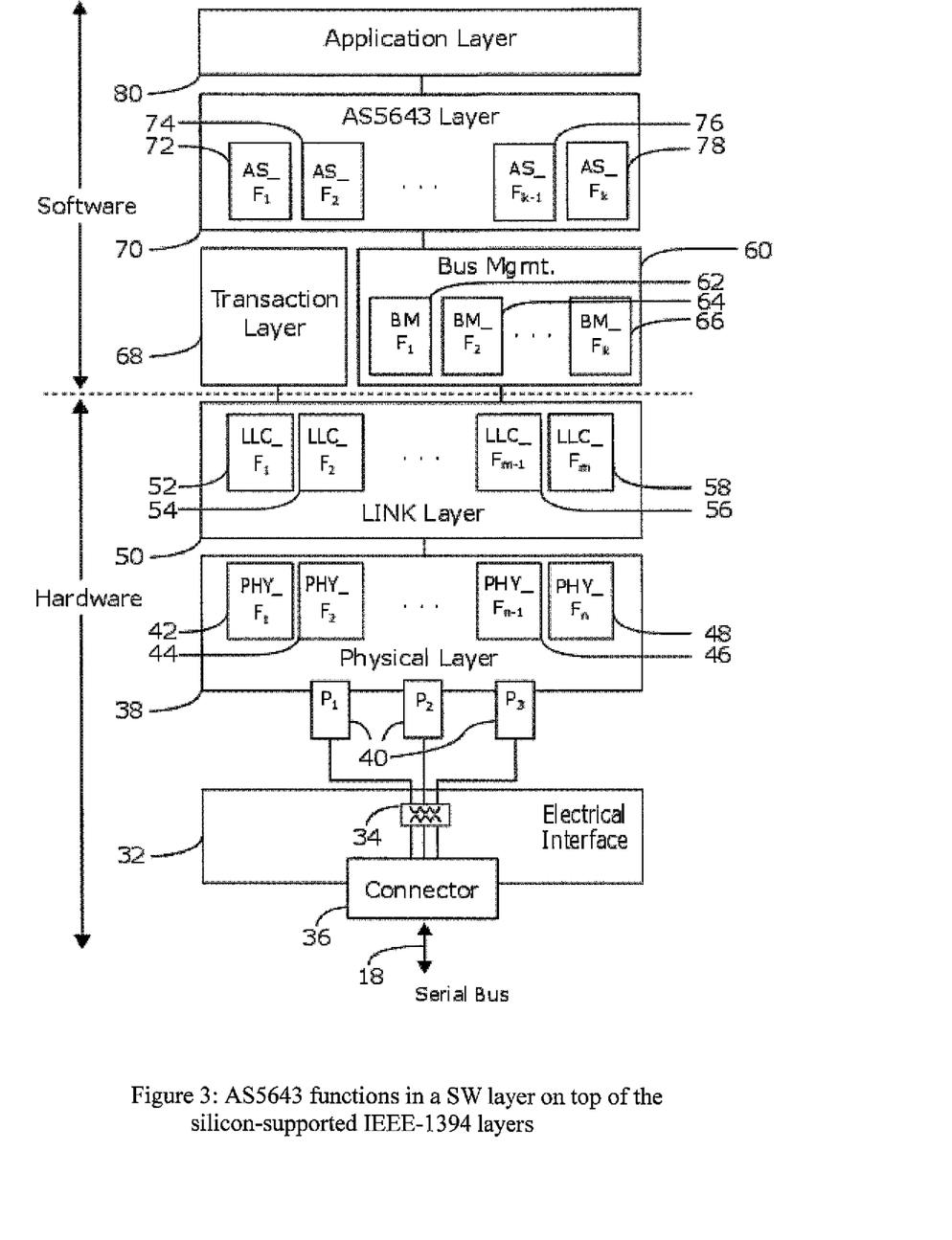
FIG. 3 illustrates a traditional approach of putting AS5643 functions in a SW layer on top of the silicon-supported IEEE-1394 layers.

FIG. 3. depicts the device structure in more detail. Data on the Serial Bus 18 enter a device via its Electrical Interface 32 comprising of a high-speed connector 36 and transformer coupling 34 added by AS5643. They then are passed on to the Physical Layer 38 via the PHY ports 40. FIG. 3. depicts the most common implementation using 3 ports. Those skilled in the art will understand that also implementations with two or even only one port can be easily realized. For certain applications having more than 3 ports available would be highly desirable. Unfortunately, commercially available silicon HW is typically limited to three ports.

FIG. 3 also depicts PHY functions 42-48 which are needed to perform toning, time sync and other services in order to establish and maintain a serial bus connection to the device's neighbors. These connections are vital for proper data exchange. Descrambling is another important example for these functions in order to pass the data on to the Link Layer 50, which again is comprised by a set of functions 52-58 ranging from data packet de-encapsulation, CRC-level data verification, dest_ID filtering all the way to Cycle Start generation. These functions are essential, not only for device-to-device communication, but also for proper IEEE-1394 compliance.

It is not the scope of this application to elaborate on the details of each of these PHY Layer functions 42-48 and Link Layer Functions 52-58. However, it is important to understand that these functions are divided into specific and isolated blocks.

FIG. 3. also depicts the Serial Bus Management 60 and Transaction Layer 68. Both blocks are drawn in order to complete the architectural representation of the IEEE-1394 technology but are only optional in AS5643 and therefore are often not implemented in AS5643 devices in order to minimize system resources as well as reduce development efforts and related costs.

Due to varying implementation details the devices can vary with regards to their integration approaches. For example, the IEEE-1394 interface of a Control Computer 10 is best connected to its local computing platform via an OHCI compliant data bus for reasons of data throughput, addressability and others. Contrary, for Remote Nodes 12-16 such an interface is often an unnecessary overkill and a simple address/data bus for simple host Read/Write operations would be sufficient. Those skilled in the art will certainly understand the differences of high-performance and managed data bus like PCI/PCe/etc. or a local data interface supporting simple data and address read/write operations. Irrelevant of such integration considerations, all of the IEEE-1394 devices share a common high-level device structure as it is depicted in FIG. 3.

With the exception of some specifics in the Electrical Interface 32—specifically the usage of avionics grade connectors 36 and the isolation transformers 34—the presented architecture is defined in the IEEE-1394 specification and the AS5643 specification does not require anything beyond those mentioned components. AS5643 specific functions 72-76 can be summarized in a separate AS5643 Layer 70. They provide functions as STOF synchronization, STOF offset packet transmission and reception, ASM packet encapsulation, packet integrity verification, channel-based transmission filtering, and several more. The essence of these functions is to provide for a deterministic transmission methodology and superimpose avionics-proven bus concepts onto a serial bus that was originally invented for other application areas.

Once the data have been authenticated and verified by the AS5643 Layer 70 then are passed on to the Application Layer 80 which is entirely defined by the usage model of the device. It is only shown as a reference but is of no further relevance in this application.

Those skilled in the art will immediately understand that the device architecture approach as depicted in FIG. 3. bears inherent challenges: when using commercially available silicon then key elements of this architecture have to be implemented in the device's SW layers. Depending on the performed tasks such execution in SW can be resource intensive and consume computing resources like MPU/MCU, RAM, etc. and adding system implementation costs. An important aspect are the timing requirements for Start-of-Frame (STOF) packet generation and STOF-offset timing for packet transmissions. As by the AS5643 specification STOF offset accuracy shall be ±0.1% and the STOFF TX/RX/Datapump offsets shall have an accuracy of 1.0% of the STOF frame rate with a maximum of 100 μs. Even a simple remote node has to permanently perform STOF packet timing, STOF packet integrity and STOF packet data status verification. Even in very simple devices this could require a real-time operating system to handle these tasks within the given timing constraints. It is needless to say that such operating systems do not come cheap.

The method described below provides an implementation that ensures backward compatibility as well as offers hardware/firmware means to provide this AS5643 functionality. In addition to the method described below, other methods may be implemented that provide the same desired results such as implementation in silicon and ASICs or any other implementation that effectively provides non-software implementations for the functions defined in AS5643.

Figure 4:
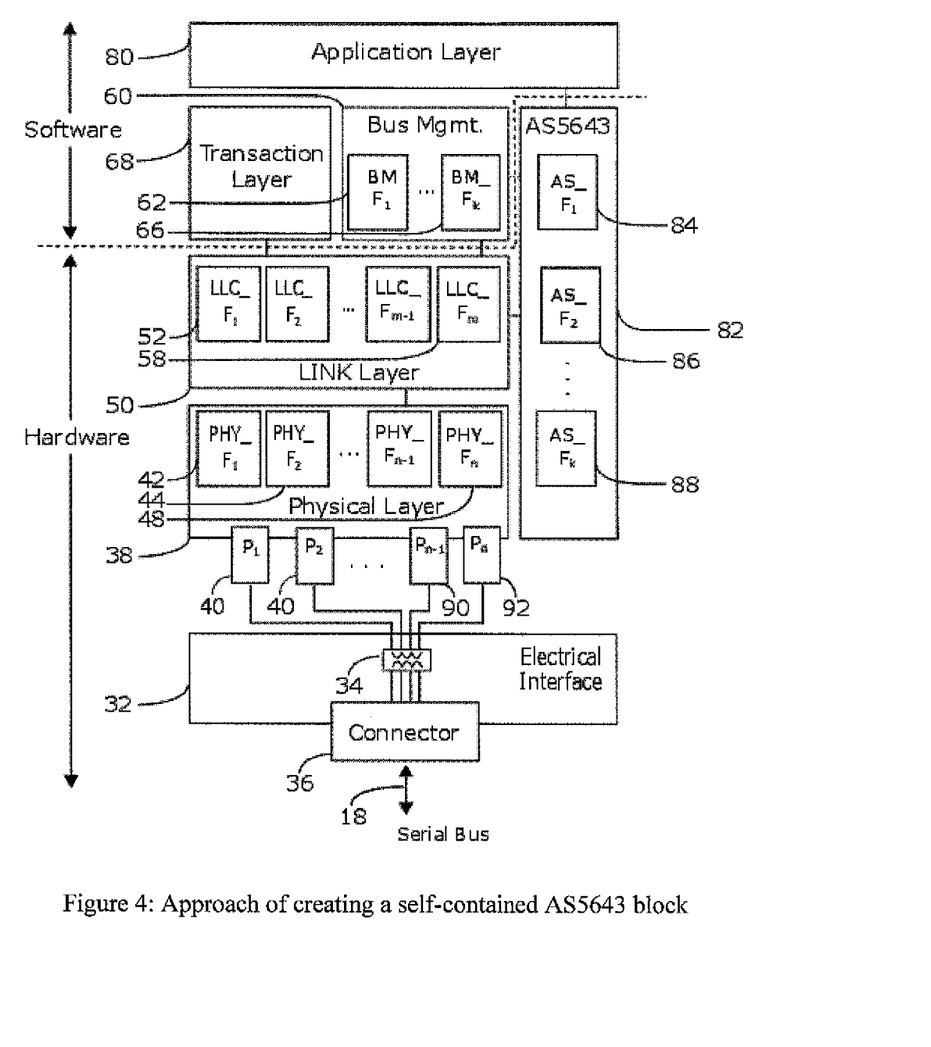
FIG. 4 illustrates an innovative approach of creating a self-contained AS5643 block, which either bypasses and/or interacts with IEEE-1394 layers.

The subject method as described in FIG. 4 moves the AS5643 layer implemented in SW into a standalone functions block 82 which provides AS5643 functional blocks 84-88. These individual modules may or may not interact with PHY, Link and Bus Management Layers 40, 60 and 70 and or their respective sub-functions. Furthermore, it is possible to increase the number by possible PHY ports 90-92 to a number limited only by the available number of transceivers within the field programmable gate array (FPGA).

Those skilled in the art will immediately understand that this implementation is likely the best with regards to containment of AS5643 functionality and might be preferable from a commercial point-of-view (packaging). However, it requires to maintain a certain amount of overhead if interaction with other 1394 layers (38, 50, 60, 68) is required. In which case it is furthermore required to adapt such 1394 layers in order to allow for the communication with the AS5643 block.

The benefit of such a block is that it can be integrated in conjunction with standard 1394 silicon or in combination with an AS5643 IP core. The first variant, i.e. in combination with standard LLC and IP silicon might not be the ideal HW architecture as it leaves throughput bottle necks and specific interfaces will have to be implemented to accommodate the specifics of the COTS silicon. However, it already has the advantage of removing the AS5643 HW and moving it into the HW layer.

Figure 5:
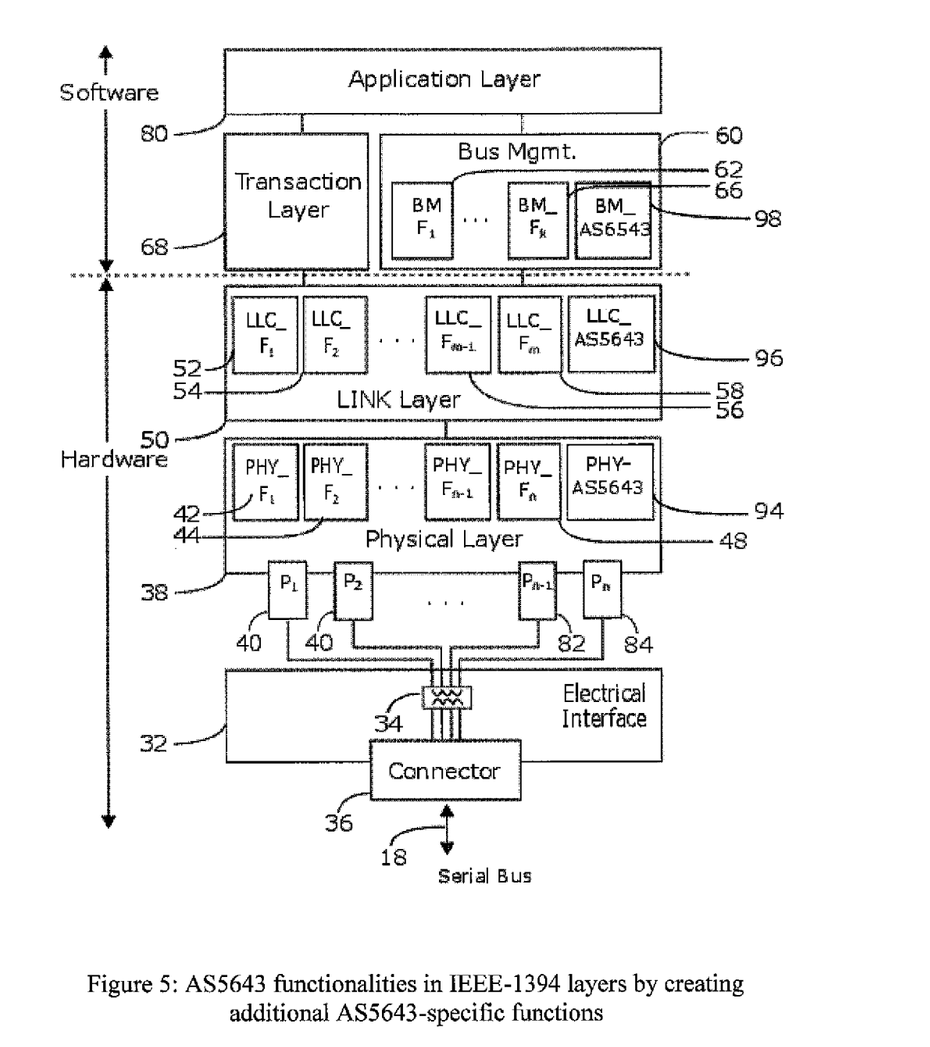
FIG. 5 illustrates the approach of adding AS5643 functionalities into IEEE-1394 layers by creating additional AS5643-specific functions

The subject method can be enhanced by adding AS5643 functionality directly in the Link, PHY and Bus Management Layers as shown in FIG. 5. Architecturally this is likely the best approach as it adds the functionality into layers that are best suited for the respective functionalities. FIG. 5 shows separate AS5643 function blocks 94 and 96 being added into existing Link and PHY Layers 38 and 50. PHY_AS5643 functions 94 refer to items that can be collectively executed with the PHY layer environment 38, whereas LLC_AS5643 functions 96 are the collection of LLC_AS5643 functions best executed within the Link Layer 50 of a device. Furthermore, Bus Management can also be extended with BM AS5643 functions 98. Together, functions 94, 96 and 98 are comprised yet not limited by the functions 72-78 of the AS5643 Layer 70 in FIG. 2. Those skilled in the art will immediately understand that this method is only realizable if the relevant IP layers 38 and 50 are implemented as one or multiple IP core(s) as COTS silicon does not allow for such expansion capabilities.

Figure 6:
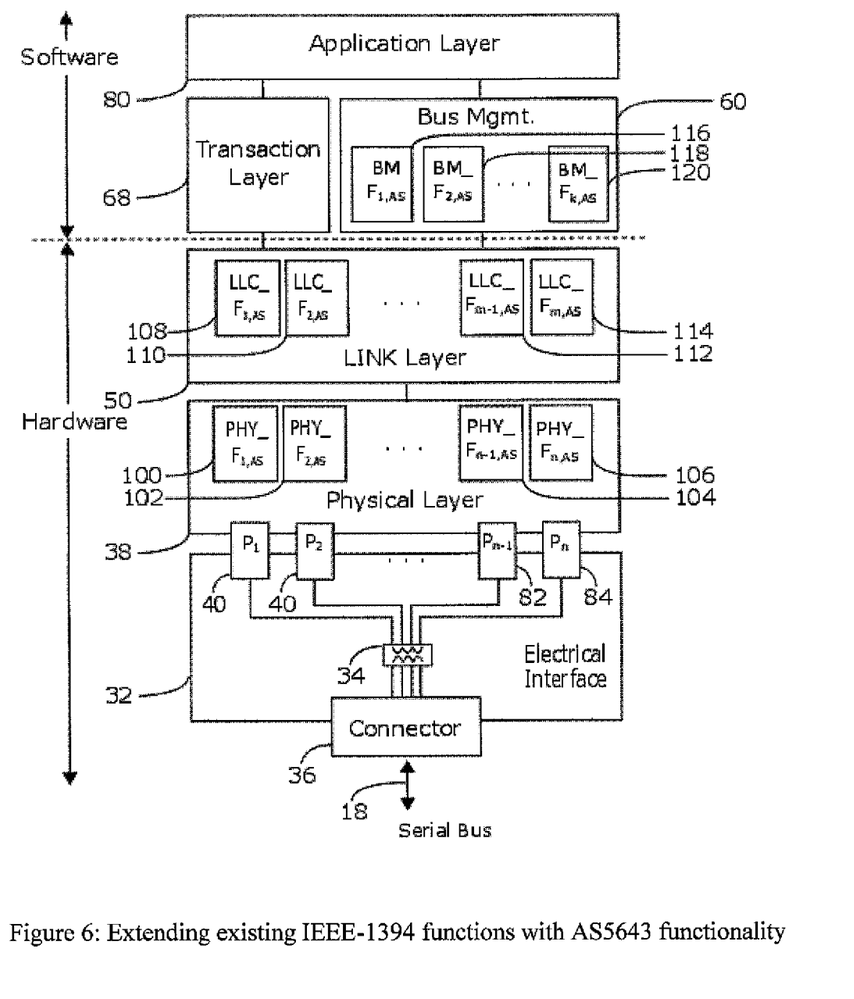
FIG. 6 illustrates the approach of extending existing IEEE-1394 functions in respective layers with AS5643 functionality

Another viable approach is to integrate the AS5643 functions 84-88 into already existing PHY functions 42-48, LLC functions 52-58 or BM functions 62-66, thereby creating a new set of extended PHY functions 100-106, extended LLC functions 108-114 and extended BM functions 116-120 as depicted in FIG. 6. Those skilled in the art will immediately understand that this method represents the most integrated implementation option and is also only realizable for true IP implementations. This variant allows for integrating AS5643 with a minimum amount of overhead and there represents the best approach with regards to resource utilization and throughput.

Figure 7:
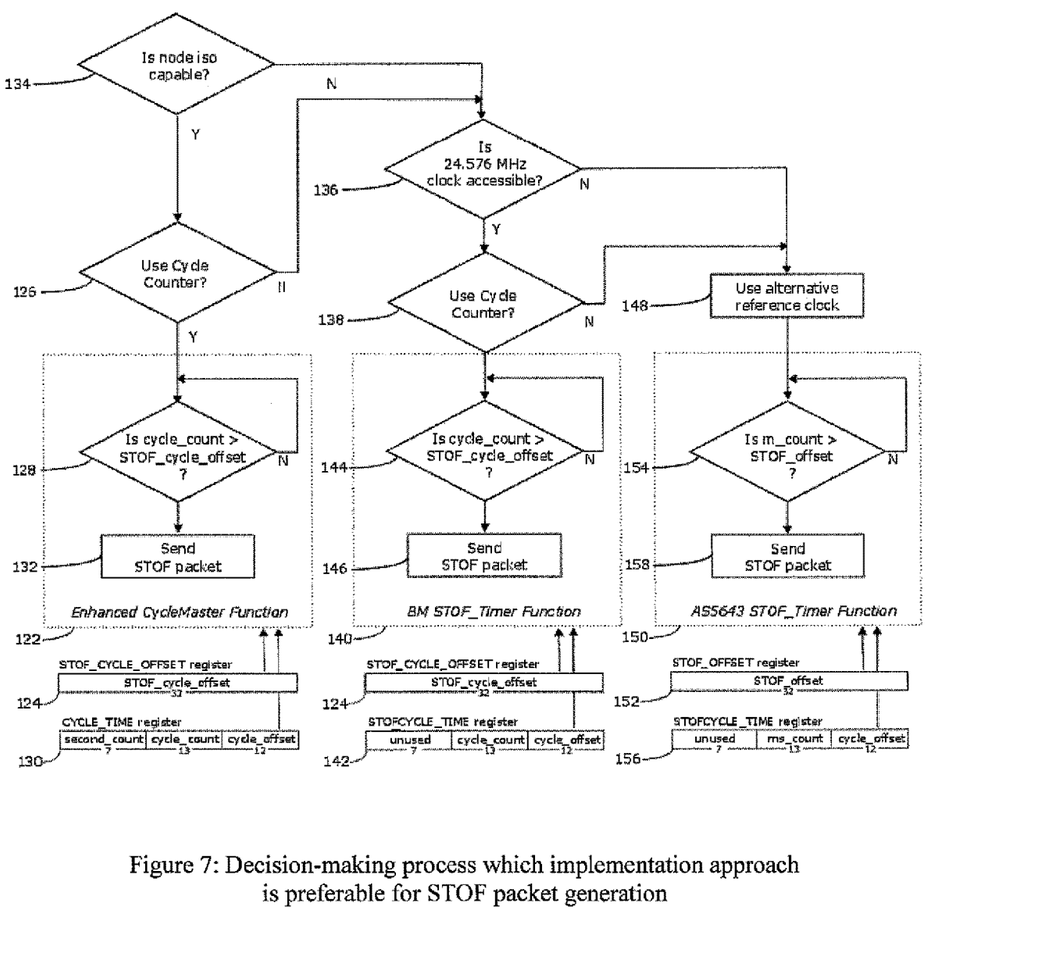
FIG. 7 illustrates a decision-making process when which implementation approach is preferable for the example of STOF packet generation.

It depends largely on the characteristics of a specific AS5643 function as well as the existing IEEE-1394 implementation if the addition is best realized as an enhancement of the IEEE-1394 function (e.g. $LLC\_F_{m,As}$), as a separate AS5643 function within a layer (e.g. LLC_AS5643) or within the AS5643 function block (e.g. LLC_AS5643). Under certain conditions an implementation can also benefit from combining for approaches and mixing specific extended functional blocks $PHY/LLC/BM\_F_{x,As}$ (FIG. 5), extensions to layers $PHY/LLC/BM\_F_{AS5643}$ (FIG. 4) or even standalone block F-AS5643 (FIG. 3). The following example is intended to demonstrate how certain aspects can influence such a decision-making process and is depicted in FIG. 7.

AS5643 defines a specific network time synchronization mechanism that all interconnected devices need to adhere to. In this mechanism the CC will transmit Start-of-frame (STOF) packets at a program-specific frame rate (e.g. 12.5 ms, 10 ms, 8 ms, etc.). The frame rate is not specified precisely within the AS5643 specification and is deferred to be selected best suited for the application and defined within the project's avionics ICD document. Simple math reveals that this frame rate can always be defined as a multiple of the IEEE-1394 specified Cycle Start period of 125 µs. For the frame rates mentioned above this equals to a count of 100, 80, 64 cycle periods. Those skilled in the art will immediately see that a simple extension of the Cycle Master function 122 with a STOF_CYCLE_OFFSET register 124 provides a possible and easy to implement mechanism for defining the transmit timing for the STOF. Assuming that the CYCLE_COUNT shall be used (126) as a reference clock then it is essential to provide a comparator 128, checking the cycle-count value in the CycleTime register 130 against the offset value in register 124. If the value of cycle_count field is greater than the STOF_cycle_offset then the a STOF packet shall be generated 132. With the CycleTime register 130 being based on the internal 24.576 MHz PHY clock the accuracy of this method is tied to this reference clock and therefore subject to inaccuracies.

If the node is not isochronous capable (134) and therefore is not required to have a CYCLE_TIME register 130 and assuming that the internal 24.576 MHz PHY clock is accessible 136 as well as further assuming that the CYCLE_COUNT shall be used (138) as a reference clock, then the STOF_Timer function 140 can be added to the Bus Management layer by creating a STOFCYCLE_TIME register 142 that behaves just like the CYCLE_TIME register 130. Its cycle_offset field shall be updated on each tick of the local 24.576 MHz PHY clock, with the exception that an increment from the value 3071 shall cause a wraparound to zero and shall carry into the cyclecount field. The value is the fractional part of the isochronous cycle of the current time, in units that are counts of the 24.576 MHz clock. The 13-bit read/write cycle_count field shall increment on each carry from the unused field, with the exception that an increment from the value 7999 shall cause a wraparound to zero and shall carry into the second_count field. The value is the fractional part of the second of the current time, in units of 125 µs. Comparing 144 this 13-bit cycle_count value against a STOF_CYCLE_OFFSET register 124 creates the same mechanism as defined before and the transmission of the STOF packet 146.

Should the node's internal design not allow for a PHY clock access then those skilled in the art will immediately understand that the alternative reference clock 148 has to be used as a source for STOF timing. For such a generic AS5643 STOF Timer Function 150 while not specified exactly, FIG. 7 suggests (although not specifically specifies it) to use a reference clock allowing to specify the STOF timing offset in multiples of microseconds (µs) in a STOF_OFFSET register 152. This way the register values are consistent with the STOF frame definitions in the ICD/AS5643 specification documents. Similar to what was explained before comparison 154 of the micro-second count field of a STOFCYCLE_TIME register 156 against the STOF_offset 152 defines the criteria whether or not to generate the STOF packet 158.

Such an interface design approach would suggest to move the AS5643_STOF_Timer function 150 into a separate AS5643 block as indicated in FIG. 4.

Those familiar with the art as well as the AS5643 specification will immediately understand that the STOF generation is only one example of functionality that can be enhanced by moving it from a SW implementation into HW. AS5643 nodes have to perform series of tasks that can be best categorized by their high-level functionalities, i.e. whether they represent AS5643_CCs or AS564 RNs.

Table 1 lists the individual categories and individual tasks that have to be performed by a CC and RNs. They can be summarized as:

TABLE 1

AS5643 functions performed by CCs and RNs

| | Node operation | Mandatory for |
|---|---|---|
| Initialization | Set PHY Register for CC node functionality | CC |
| | Set PHY Register for RN node functionality | RN |
| | Update STOF offsets for connected RNs | CC |
| | Update Network bus mode after power up | CC |
| STOF Generation | Encapsulate STOF packet content (CC Status, Network Bus Mode Vehicle State, VPC) | CC |
| | Transmit at valid STOF frame rate | CC |
| System Integrity Management | Validate STOF Timing | RN |
| | Validate STOF Validity indicators, STOF content | |
| | Verify correctness of ASM messaging | |
| STOF Synchronization | Synchronize local time register with valid STOF packets | RN |
| Internal STOF Timing | Maintain local timing if CC stops sending STOF | RN |
| ASM-Message Generation | Encapsulate ASM packet content (1394 Async Stream Header, ASM header (MessageID, NodeID, Priority, dataLength, HealthStatus, Heartbeat, Message Data, STOF_Offsets, VPC)) | CC & RN |
| | Transmit at valid STOF TransmitOffset | |
| ASM-Message Receive & Integrity Validation | Filter on channels (local nodeID, broadcast) | CC & RN |
| | Validate packet receive at valid STOF_ReceiveOffset and valid indicators (Heartbeat increment, VPC) | |
| | Filter on channels (STOF, local nodeID, broadcast) | |
| | Validate packet receive at valid STOF_ReceiveOffset and valid indicators (Heartbeat increment, VPC) | |
| HW Failure Detection | Detect Intermittent Electrical Connection | CC & RN |
| | Detect Marginal Signal Quality | |
| | Detect "Looping" Power Supply | |
| | Detect and Block High-frequency Bus Reset Generation (from local host) | |

It is beyond the scope of this application to analyze how to implement each function mentioned in Table 1 with regards to the different approaches one by one. However, those skilled in the art will recognize immediately that the same or very similar arguments presented for the STOF packet generation are applicable as well.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right is claimed are defined as follows:

1. A method for enhancing an execution of AS5643 functions within AS5643 bus nodes and at the same time reducing overall software requirements and complexity, the method steps comprising:
   customizing functional layers, that implement an IEEE-1394 serial bus interface, by adding one or more AS5643 function blocks to the IEEE-1394 serial bus interface, the AS5643 function blocks including firmware and hardware;
   customizing existing elements of firmware and hardware layers that implement an IEEE-1394 serial bus interface by adding one or more AS5643 functions to the IEEE-1394 serial bus interface, the AS5643 functions including firmware and hardware;
   providing the AS5643 function blocks with a programmable code and wherein settings and parameters for the execution and behavior of the AS5643 functions are controlled by values of configuration registers of an individual field within the programmable code;
   providing the AS5643 function blocks with suitable time reference inputs, which can be external Start-of-Frame (STOF) packets; and
   providing the AS5643 function blocks with suitable time reference inputs, which can be Start-of-Frame (STOF) related local timing signals derived from a Cycle_Start frequency or other timers.

2. The method as described in claim 1 further including providing the function blocks with a STOF_CYCLE_OFFSET register derived from a Cycle Master function or other time source, the STOF_CYCLE_OFFSET register providing transmit timing for the Start-of-Frame (STOF) packets.

3. The method as described in claim 1 further including a step of controlling the programmable code using one or more register fields in a circuit, the circuit being a code execution platform.

4. The method as described in claim 1 wherein the register fields provide settings for the AS5643 function blocks to control the execution and performance of the AS5643 functions.

5. The method as described in claim 1 wherein the register fields define settings for individual functions in the AS5643 functional blocks.

6. The method as described in claim 1 wherein the register fields define settings for individual functions in the AS5643 function blocks and are function specific.

7. The method as described in claim 1 wherein the AS5643 function blocks includes one or more individual AS5643 functions.

8. The method as described in claim 1 wherein the AS5643 function blocks includes specific functionality and applicability of AS5643 functions as defined in AS5643 specifications.

9. The method as described in claim 1 wherein the programmable code provides control and data exchange between the AS5643 function blocks and the IEEE-1394 serial bus.

10. The method as described in claim 1 wherein the programmable code is programmed through one or more input signals in the circuit.

11. A method for enhancing an execution of AS5643 functions within AS5643 bus nodes and at the same time reducing overall software requirements and complexity, the method steps comprising:
   customizing functional layers, that implement an IEEE-1394 serial bus interface, by adding one or more AS5643 function blocks to the IEEE-1394 serial bus interface, the AS5643 function blocks including firmware and hardware:
   customizing existing elements of firmware and hardware layers that implement an IEEE-1394 serial bus interface by adding one or more AS5643 functions to the IEEE-1394 serial bus interface, the AS5643 functions including firmware and hardware;
   providing the AS5643 function blocks with a programmable code and wherein settings and parameters for the execution and behavior of the AS5643 functions are controlled by values of configuration registers of an individual field within the programmable code;
   providing the AS5643 function blocks with suitable time reference inputs, which can be external Start-of-Frame (STOF) packets;
   providing the AS5643 function blocks with suitable time reference inputs, which can be Start-of-Frame (STOF) related local timing signals derived from a Cycle_Start frequency or other timers;
   providing the function blocks with a STOF_CYCLE_OFFSET register derived from a Cycle Master function or other time source, the STOF_CYCLE_OFFSET register providing transit timing for the Start-of-Frame (STOF) packets; and
   controlling the programmable code using one or more register fields in a circuit, the circuit being a code execution platform.

12. The method as described in claim 11 wherein the register fields provide settings for the AS5643 function blocks to control the execution and performance of the AS5643 functions.

13. The method as described in claim 11 wherein the register fields define settings for individual functions in the AS5643 functional blocks.

14. The method as described in claim 11 wherein the register fields define settings for individual functions in the AS5643 function blocks and are function specific.

15. The method as described in claim 11 wherein the AS5643 function blocks includes one or more individual AS5643 functions.

16. The method as described in claim 11 wherein the AS5643 function blocks includes specific functionality and applicability of AS5643 functions as defined in AS5643 specifications.

17. The method as described in claim 11 wherein the programmable code provides control and data exchange between the AS5643 function blocks and the IEEE-1394 serial bus.

18. The method as described in claim 11 wherein the programmable code is programmed through one or more input signals in the circuit.

19. A method for enhancing an execution of AS5643 functions within AS5643 bus nodes and at the same time reducing overall software requirements and complexity, the method steps comprising:
   customizing functional layers, that implement an IEEE-1394 serial bus interface, by adding one or more AS5643 function blocks to the IEEE-1394 serial bus interface, the AS5643 function blocks including firmware and hardware:
   customizing existing elements of firmware and hardware layers, the implement an IEEE-1394 serial bus interface by adding one or more AS5643 functions to the IEEE-1394 serial bus interface, the AS5643 functions including firmware and hardware;
   providing the AS5643 function blocks with a programmable code and wherein settings and parameters for the execution and behavior of the AS5643 functions are controlled by values of configuration registers of an individual field within the programmable code;
   providing the AS5643 function blocks with suitable time reference inputs, which can be external Start-of-Frame (STOF) packets;
   providing the AS5643 function blocks with suitable time reference inputs, which can be Start-of-Frame (STOF) related local timing signals from a Cycle_Start frequency or other times;
   providing the function blocks with a STOF_CYCLE-_OFFSET register derived from a Cycle Master function or other time source, the STOF_CYCLE_OFFSET register providing transit timing for the Start-of-Frame (STOF) packets;
   controlling the programmable code using one or more register fields in a circuit, the circuit being a code execution platform, the register fields providing settings for the AS5643 function blocks to control the execution and performance of the AS5643 functions, the register fields defining settings for individual functions in the AS5643 functional blocks, and the register fields defining settings for individual functions in the AS5643 function blocks and are function specific.

20. The method as described in claim 19 wherein the AS5643 function blocks includes one or more individual AS5643 functions.

21. The method as described in claim 19 wherein the programmable code provides control and data exchange between the AS5643 function blocks and the IEEE-1394 serial bus.

* * * * *